March 5, 1957   W. M. McCLEAREN   2,783,772
JET TUBE VALVE
Filed Sept. 8, 1954   2 Sheets-Sheet 1
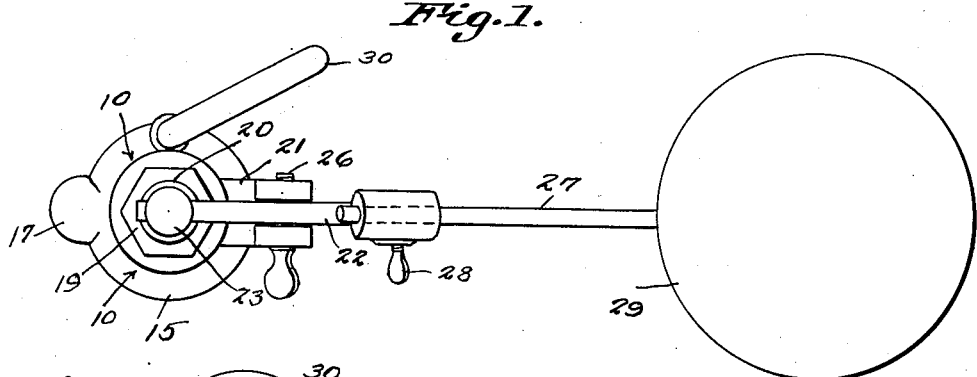
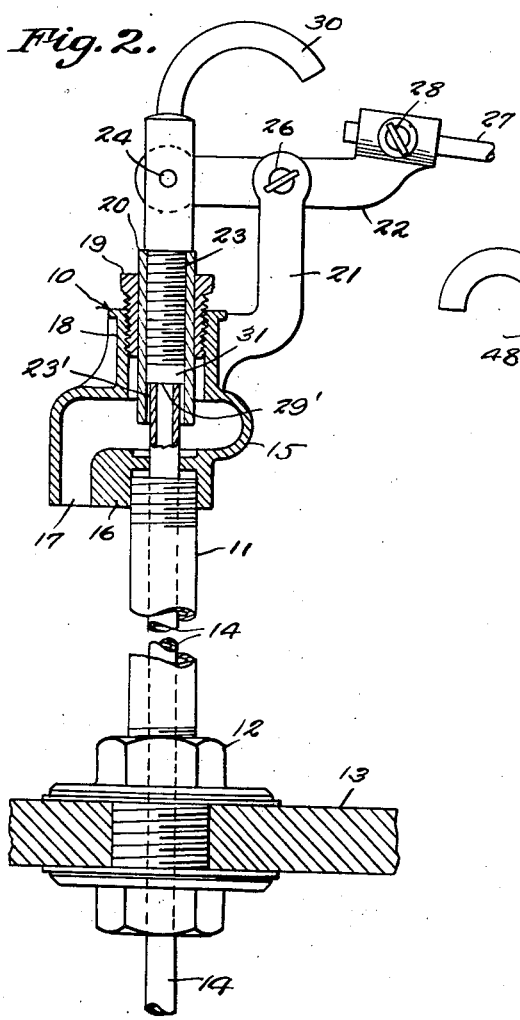
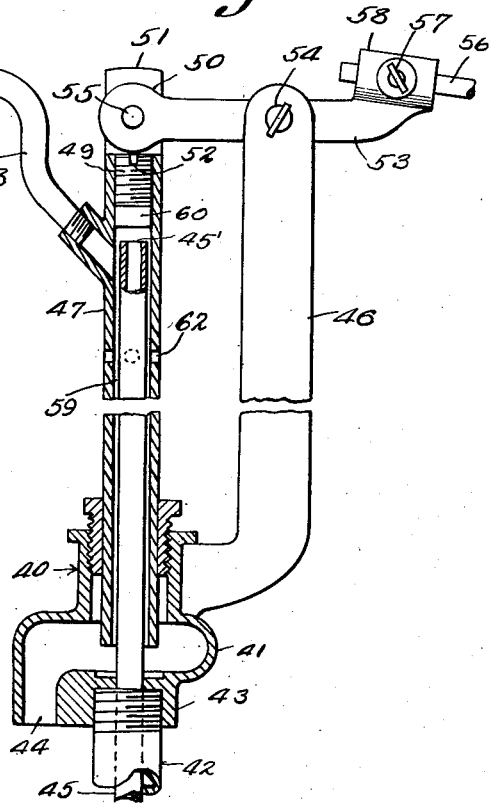
W. M. McClearen
INVENTOR
BY C. A. Snow & Co.
ATTORNEYS.

March 5, 1957  W. M. McCLEAREN  2,783,772
JET TUBE VALVE
Filed Sept. 8, 1954  2 Sheets-Sheet 2
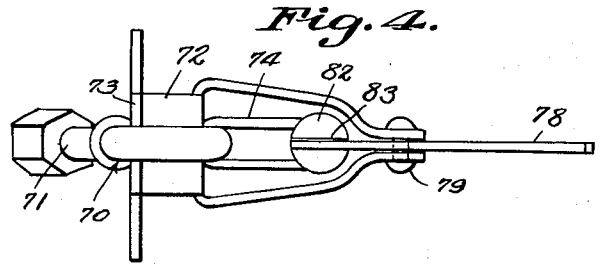
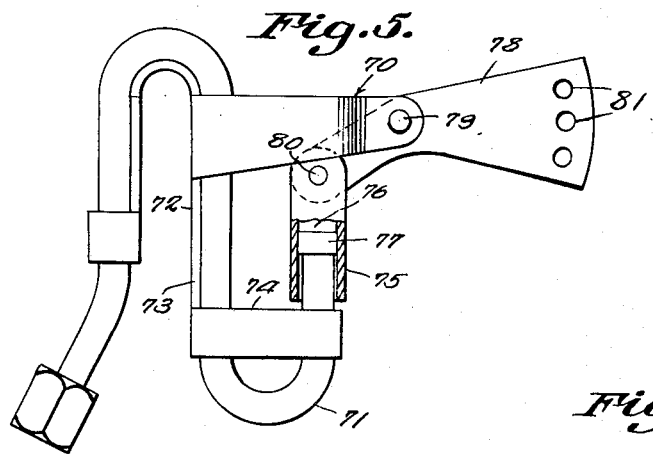
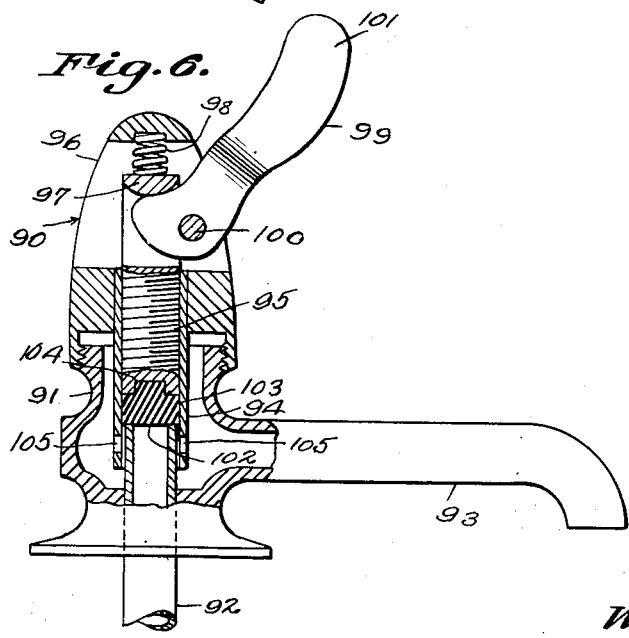
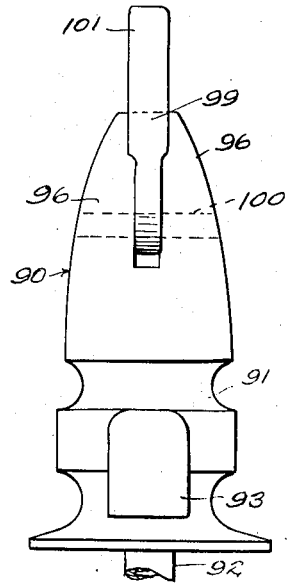
W. M. McClearen
INVENTOR
BY Cadmow Heo.
ATTORNEYS.

United States Patent Office 2,783,772
Patented Mar. 5, 1957

2,783,772

JET TUBE VALVE

William M. McClearen, Fresno, Calif.

Application September 8, 1954, Serial No. 454,805

1 Claim. (Cl. 137—444)

This invention relates to an improved jet tube valve and more particularly to a jet tube valve which is adapted for use with various types of faucets to insure an arcuate control of the flow of fluid, including a flow of water to fill a tank of a toilet flush tank or the like.

It is an object of this invention to provide a jet tube valve of the kind to be more particularly described hereinafter having a soft rubber gasket to shut off the flow of inlet fluid without a twist or grind of the gasket on the end of the inflow pipe.

Another object of this invention is to provide a jet tube valve of this kind having a replaceable seal or gasket which may be replaced by simply sliding the seal or gasket from the tap after the valve controlling connecting tap has been removed from the valve.

Yet another object of this invention is to provide a jet tube valve of the kind having a fluid inlet tube and a gasket for closing an open end of the inlet tube with the gasket being slidable from within an end of slidable tubular tap adjacent the end of the inlet tube of the valve whereby the gasket may be slid from the tubular tap and replaced by another gasket after the tubular tap has been unthreaded to permit the removal of the gasket by sliding from the jet tube valve.

Other and further objects and advantages of the invention will be hereinafter described and the novel features thereof defined in the appended claim.

Referring to the drawings:

Fig. 1 is a top plan view of a jet tube valve constructed according to an embodiment of my invention.

Fig. 2 is a vertical section through the jet tube valve of Fig. 1.

Fig. 3 is a vertical section of a modified form of the jet tube valve.

Fig. 4 is a top plan view of a second modified form of my invention.

Fig. 5 is a side elevation, partly broken away, with a portion of the broken away part in section of a second modified form of jet tube valve shown in Fig. 4.

Fig. 6 is a side elevation of a third modified form, partly broken away with the broken away part in section of my jet tube invention.

Fig. 7 is a front elevation of the third modified form of jet tube valve shown in Fig. 6.

Referring more specifically to the drawings the numeral 10 designates generally a jet tube valve constructed according to an embodiment of my invention whereby the gasket or jet tube sealing member may be slidably removed from the structure of the jet tube valve.

The jet tube valve 10 is supported on the upper end of a jet tube supporting tube or member 11 which is secured to the bottom or lower wall 13 by packing nuts 12 engaged about the supporting tube 11 and disposed on the opposite sides of the bottom 13 as clearly shown in Fig. 2 of the drawings.

A fluid inlet or supply pipe 14 is disposed within the supporting tube 11 and connected at one end, the end not shown in the drawings, to a source of fluid supply ordinarily provided for the flush tank in a house or in a business location. The upper end of the fluid inlet pipe 14 is open as indicated by the numeral 29' in the drawings to be disposed within the confines of a hollow body or housing 15 supported on the upper end of the supporting tube 11 and above the bottom wall 13 of the flush tank.

A boss 16 extends downwardly from the body 15 to be threadably engaged with the upper end of the supporting tube 11 and an outwardly extending spigot 17 is formed integral with the body 15.

A boss or nipple 18 is formed integral with the body 15 opposite from the lower boss 16 and a packing nut or guide 19 is threadably engaged within the upper boss 18 conventionally as in ordinary plumbing or pipe connections.

A sleeve 20 is slidably engaged within the packing nut or guide 19 and the sleeve 20 is so engaged with the packing nut or guide 19 that no further packing or sealing means is necessary and need not be provided on my jet tube valve.

On the side of the nipple 18 there is provided an upwardly extending supporting arm or member 21 which extends vertically upward from the nipple 18.

A lever 22 is pivoted intermediate the length thereof on the upper end of the arm 21 and a plunger 23 is pivotally connected to one end of the lever 22 whereby a space 23' is formed between the tube 14 and the sleeve 20. The pivotal connection between the end of the lever 22 and the plunger 23 is accomplished by way of a pivot pin 24 which extends through an opening in the side of the plunger to constitute a yoke 25 within which the end of the lever 22 is engaged.

A pivot pin 26 is disposed between the upper end of the support 21 and the lever 22, intermediate the length of the lever, an elongated rod 27 is carried by the other end of the lever being secured thereon by a set screw 28 engaged through a sleeve on one end of the lever and engageable with the outer surface of one end of the rod 27.

A float 29 is carried by the other outer end of the rod 27 whereby the float 29 is disposed within the flush tank and will depend upon the amount of water within the flush tank for the raising and lowering of the other end of the lever 22 and the raising or lowering of the plunger 23 within the sleeve 20.

A pipe or second spigot 30 is communicated with the body 15, through the upper surface thereof, and extends upwardly and outwardly therefrom to provide for the free flow of water, or other liquid, from the body 15 outwardly to within the flush tank.

A gasket 31 is secured on the lower end of the plunger 23 and is adapted to close the upper open end 29' of the fluid inlet pipe 14 when the plunger 23 is lowered within the sleeve and will open the opening 29' to provide for the free flow of water upwardly from the inlet pipe at the time that it is desired to permit the flow of water to within the flush tank and the float 29 is moved to its lowermost position.

The space 23' between the plunger and the sleeve will provide a sort of jet for the jet movement of the water into the flush tank when the gasket 31 is moved away from the upper open end of the fluid inlet pipe 14.

In Fig. 3 of the drawings, there is shown a modified form of this invention wherein the improved tube valve is designated by the numeral 40 and is provided with a circular hollow body 41 threadably connected on the upper end of a supporting tube 42 with the interiorly threaded boss 43 threadably engaging the exteriorly threaded upper end of the supporting tube 42.

The body 41 is provided with an outwardly extending nozzle or spigot 44 adjacent to the upper open end of the supporting tube 42 and an inlet pipe 45 is disposed within the supporting tube 42 having an upper open end 45' spaced upwardly above the hollow body 41.

A support arm 46 is secured at its lower end to the body 41 and extends upwardly therefrom.

A sleeve 47 is carried by the body 41 on a side thereof opposite to the upper open end 45' of the inlet pipe 45.

A pipe or spigot 48 is formed on, or secured to the sleeve 47 upwardly from the body 41 and a plunger 49 is threadably disposed within the sleeve 47 having the inner end of the plunger 49 spaced from the upper end 45 of tube 45 to provide a jet opening between the plunger and the tube 45.

A yoke 50 is formed on the upper end of the sleeve 47 having a pair of horizontally spaced apart upwardly extending yoke arms 51. The upper end of the plunger 49 is provided with a horizontally extending kerf within which a blade of a screw driver may be engaged for threading the plunger 49 into the sleeve 47.

A lever 53 is pivoted, intermediate the length thereof on the upper end of the supporting arm 46 by a pivot pin 54 which extends through the upper ends of the yoke arms 51 and through an opening in the lever 53 between the opposite ends of the lever.

A second pivot pin 55 is engaged between one end of the lever 53 and the upwardly extending yoke arms 51 for the purposes to be described hereinafter. An elongated rod 56 is carried by the end of the lever 53 remote from the plunger 49 and one end of the rod 56 is secured by a set screw 57 engaging transversely through the sleeve 58 on the other end of the lever 53 remote from the plunger 49.

A float, not shown in the drawings, is carried by the rod 56 remote from the valve 40 for use and operation the same as the float 29 and rod 27 described above.

A space 59 is formed between the tube 45 and sleeve 47 to provide for the jet movement of the fluid within the discharge or upper portion of sleeve 47.

A gasket 60 is secured to the lower end of the plunger 49 for closing the upper open end 45' of the inlet 45. Openings 62 are also formed through the walls of the sleeve 47 to provide for the free flow of water outwardly from the sleeve and into the flush tank when the gasket 60 is moved to an open position in relation to the upper open end of the inlet pipe 45. With the gasket 60 in a closed position the passage of water is somewhat limited from the inlet pipe 45 outwardly through the sleeve 47 until the float is fully moved to its full upper position when the flush tank is filled with water.

In Figs. 4 and 5 of the drawings there is shown another modified form of this invention with the pipe valve designated generally by the numeral 70 in the drawings having an inlet tube 71 connected thereto. The inlet tube 71 is bent to provide an upwardly extending portion and a second upwardly extending portion connected to the first mentioned upwardly extending portion by a bight portion of the inlet tube 71.

The supporting arm 72 overlies one portion of the inlet tube 71 and an upwardly extending supporting arm 73 is disposed on one side of the inlet tube 71 with a second horizontal supporting arm 74 connected thereto for engaging the other upwardly extending portion of the inlet tube 71.

A sleeve 75 is disposed in spaced relation to the inlet tube 71, as clearly shown in Fig. 5 of the drawings, and a plunger 76 is adjustably disposed in the sleeve 75 having a gasket 77 for closing the upwardly extending open end of the inlet tube 71. A lever 78 is pivotally connected to the horizontally extending supporting arms by a pivot pin 79 extending through the lever 78 intermediate the length thereof and through the horizontally extending supporting arms remote from the upper open end of the inlet tube 71.

A second pivot pin 80 is engaged between the upper end of the plunger 76 and through one end of the lever 78 for pivotally connecting the lever to the upper end of the plunger for moving the gasket into and out of closing engagement with the upper end of the inlet tube 71.

A plurality of spaced apart openings 81 are provided on the other end of the lever 78 for connection to a suitable float, not shown in the drawings, by a suitable and proper connecting rod, not shown in the drawings, much in the same manner as the connecting rods described above.

A yoke 82 is formed on the upper end of the plunger 76 by forming a slot 83 transversely of the upper end of the plunger 76 within which the end of the lever, connected to the plunger, is engaged.

In Figs. 6 and 7 there is shown another modification of this jet tube valve invention wherein the jet tube valve is moved to an open position, relative to the inlet pipe 92 on the circular hollow body 91. A spigot 93 is formed on, or connected to one side of the body 91 of the valve 90 and a sleeve 94 is slidably supported within the body for closing the upper open end of the inlet pipe 92.

A plunger 95 is threadedly secured on its outer side to the inner surface of the sleeve 94.

A yoke 96 is formed on the upper end of the sleeve 94 and another yoke 97 is secured to, or formed on the upper end of the plunger 95 to aid in the operation of the valve 90.

A coiled spring 98 is disposed between the bight portion of the yoke 96, on the sleeve 94 for constantly urging the plunger 95 downwardly into closing engagement with the upper open end of the inlet pipe 92.

A lever 99 is pivotally mounted, adjacent one end thereof, within the yoke 96 of the sleeve 94 by a pivot pin 100 which extends transversely of the side members of the upwardly extending yoke 96 while the extreme end of the lever 99 extends within the yoke 97 on the plunger 95.

The other outer end of the lever 99 is extended outwardly from the valve 90 and will form a sort of handle for manual operation of the valve 90.

In the use and operation of the valve 90, the inlet pipe 92 may be secured to a suitable source of water fluid and the spigot 93 will provide for the free passage of water, or other fluid from the inlet pipe 92, outwardly to be used or otherwise distributed when, where, and as desired by the user.

A gasket 102 is secured to the lower end of the plunger 95 for closing the upper open end of the inlet pipe 92 and the gasket 102 is provided with an upwardly extending lug 103 which is seated in a recess 104 on the lower end of the plunger.

The gasket 102 may be removed from the valve 90 by merely unscrewing the plunger from the sleeve and prying the gasket 102 loose from the plunger.

Laterally extending openings 105 are formed in the lower end of the sleeve 94 below the lower end of the plunger 95 and below the gasket 102 and the openings 105 provide for the limiting of the flow of water from the inlet pipe 92 outwardly through the spigot 93 when the gasket 102 is near to its closed position relative to the inlet pipe 92.

While the specific details of this invention have been herein shown and described, the invention is not confined thereto as changes and alterations may be made without departing from the spirit and scope thereof as defined in the appended claim.

I claim:

A jet tube valve comprising an upright tubular support, a housing fixed on the upper end of said support, a discharge spout carried by said housing, a fluid supply pipe extending loosely through said support, a nipple extending upwardly from said housing, said pipe terminating in the lower portion of said nipple, a guide carried by said nipple, a sleeve slidable in said guide and loosely telescoping the upper end of said pipe, a plunger threaded into the upper end of said sleeve, a gasket fixed relative to the inner end of said plunger and confronting the open upper end of said pipe, an upwardly projecting arm carried by said nipple, a sleeve actuating lever pivoted between the ends thereof on said arm, means pivotally connecting one end of said lever with said plunger, and a float connected with the other end of said lever.

References Cited in the file of this patent

UNITED STATES PATENTS

| 608,897 | McPartland | Aug. 9, 1898 |
| 1,567,198 | Sherwood | Dec. 29, 1925 |
| 1,787,420 | Peitzman | Dec. 30, 1930 |
| 2,164,927 | Kohler | July 4, 1939 |
| 2,299,074 | Bereny | Oct. 20, 1942 |